United States Patent [19]

Spargo

[11] 3,995,520
[45] Dec. 7, 1976

[54] SUGAR CANE DIVIDING MEANS

[75] Inventor: Ronald F. Spargo, Bundaberg, Australia

[73] Assignee: Massey-Ferguson Services N.V., Curacao, Netherlands Antilles

[22] Filed: May 23, 1975

[21] Appl. No.: 580,254

[30] Foreign Application Priority Data

June 5, 1974 United Kingdom ............ 24816/74

[52] U.S. Cl. .................................. 83/345; 56/13.9
[51] Int. Cl.² ..................... B26D 7/06; A01D 55/18
[58] Field of Search ............... 83/345, 346; 241/79, 241/221, 222, 282.1; 56/13.9, 13.8

[56] References Cited
UNITED STATES PATENTS

| | | | |
|---|---|---|---|
| 1,751,562 | 3/1930 | Stinger | 83/346 X |
| 2,546,221 | 3/1951 | Funk | 83/345 X |
| 3,165,954 | 1/1965 | Huck | 83/346 X |
| 3,325,335 | 6/1967 | Martensson | 83/346 X |
| 3,434,271 | 3/1969 | Gaunt et al. | 56/13.8 X |

Primary Examiner—Willie G. Abercrombie
Attorney, Agent, or Firm—Robert L. Farris

[57] ABSTRACT

Cane chopping apparatus for use in a sugar cane harvester comprises contra-rotating cane chopping elements at least one of which carries a cane feed member to assist the passage of cane in the desired manner. The cane feed member is formed of resilient material for example textile-reinforced rubber sheeting. This material improves the feeding action of the feed member and renders it less susceptible to damage.

7 Claims, 6 Drawing Figures

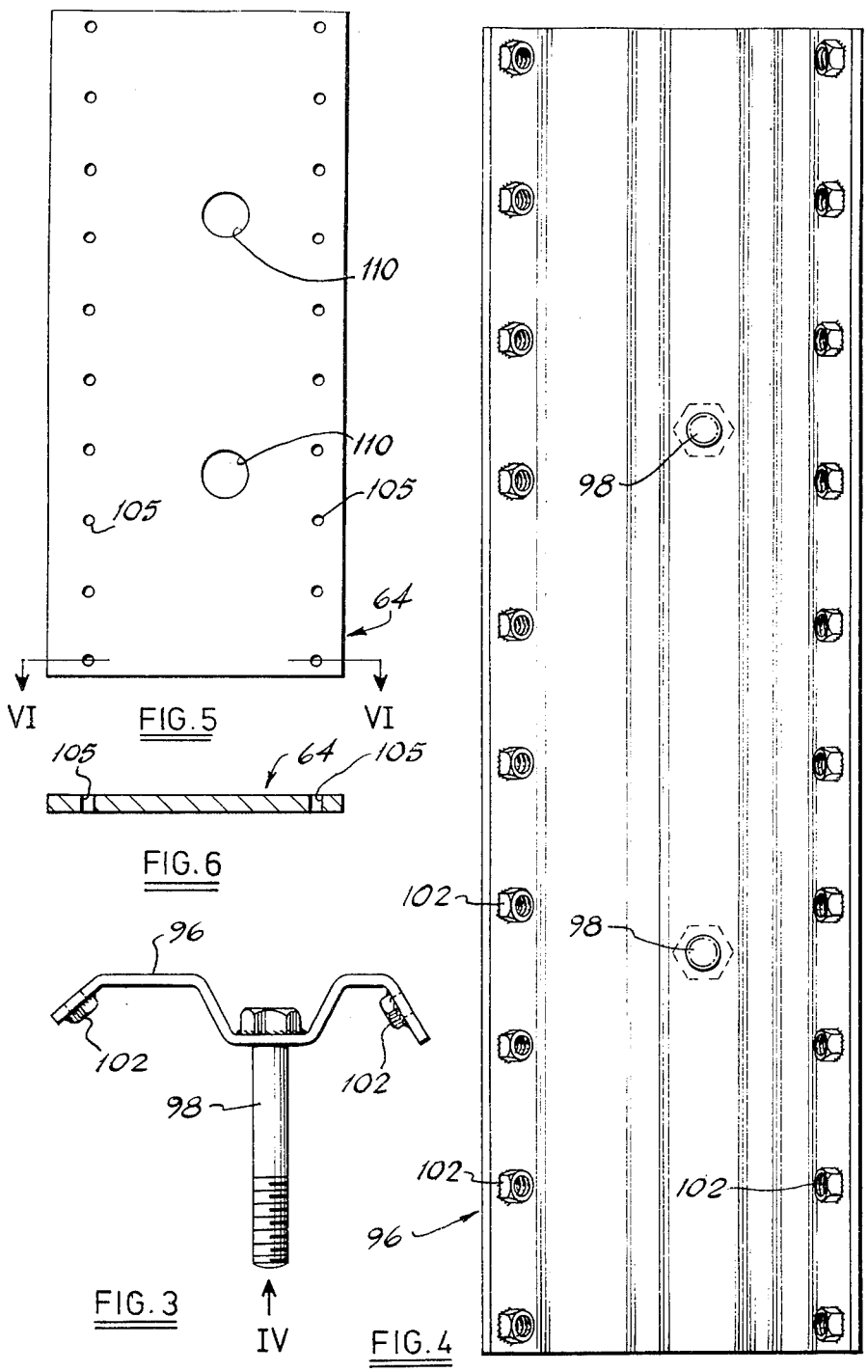

SUGAR CANE DIVIDING MEANS

This invention relates to cane dividing means operative to cut sugar cane sticks into billets. Such apparatus may be used in mobile sugar cane harvesters for cutting harvested cane sticks into shorter lengths prior to transportation to a crane processing mill. Such apparatus may also be used in cane mills for cutting into pieces cane sticks harvested by hand or by whole stick cane harvesters. Such apparatus is also used in cane planters for dividing cane sticks into pieces of a suitable length for deposition in a furrow in the ground.

In our Argentine patent number 198,517, there is disclosed cane dividing means comprising a pair of contra-rotatable cane cutting elements, a blade mounted on each cutting element, the blades being positioned so as to co-operate with each other to divide canes passing between the cutting elements as the cutting elements rotate, together with a cane feed member mounted on each of the cane cutting elements and positioned for engagement with the cane as the cane is cut. The cane feed members each comprise a U-section member which is formed of rigid steel plate in order to stand up to the arduous conditions of use to which it is subjected in a sugar cane harvester. In such a harvester, the cane dividing and feeding apparatus not only has to cope with layers of harvested cane of varying thickness but also with occasional rocks or fencing posts which from time to time are fed into the harvester in a mass of tangled cane sticks being harvested.

Although the apparatus referred-to in the preceding paragraph operates effectively, it is nevertheless susceptible of improvement as regards the feeding of the crop through the cane dividing means and as regards the resistance of the feed members to damage, by rocks for example. It is an aim of the invention to provide improvements in one or both of these respects.

An embodiment of the invention will now be described by way of example with reference to the accompanying drawings in which:

FIG. 3 shows an end view of a support member for a cane feed member, which is also seen in FIG. 2;

FIG. 4 shows the support member of FIG. 3 as viewed in the direction of arrow IV in FIG. 3 i.e. in plan view;

Figure 1:
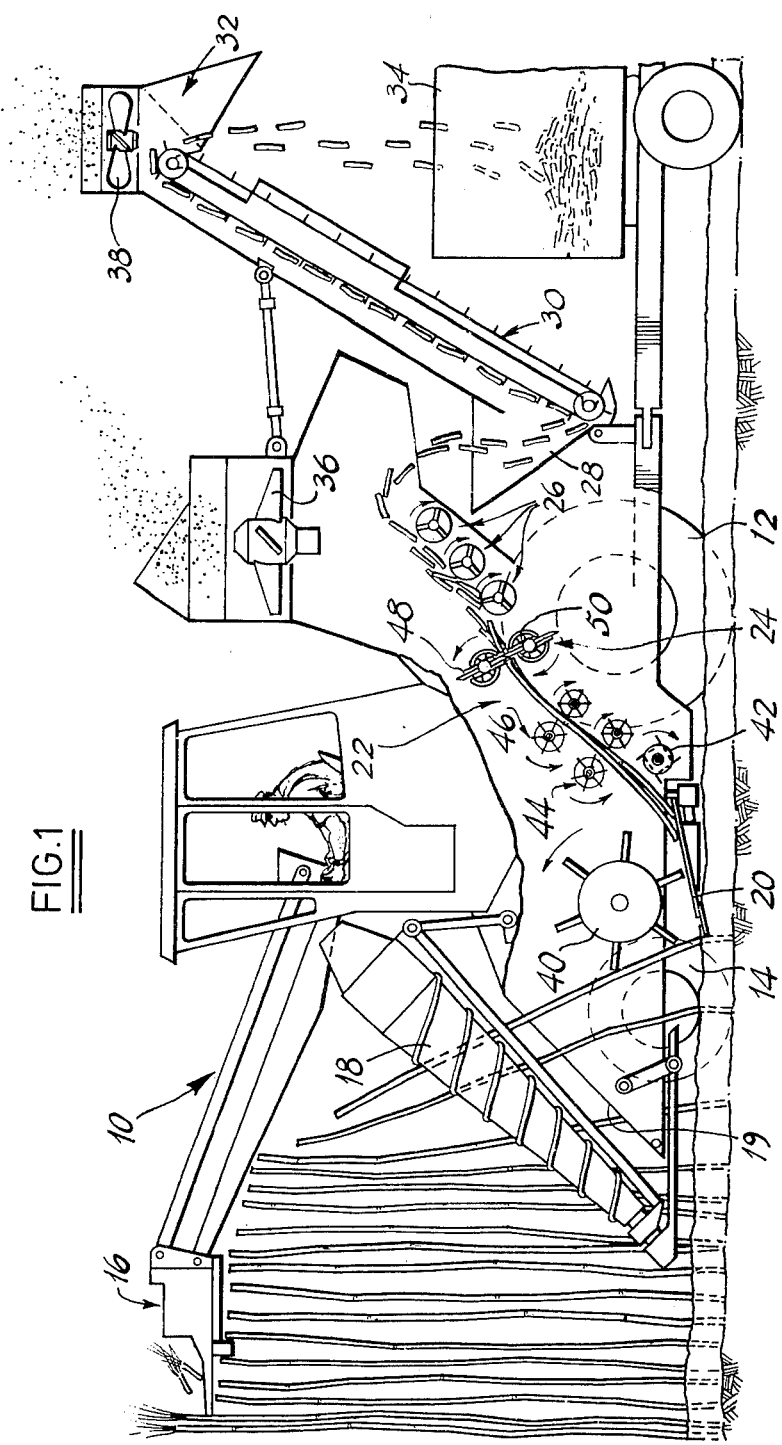
FIG. 1 shows in side elevation a sugar cane harvester partly cut away to reveal its crop handling apparatus including cane dividing means.

FIG. 5 shows a cane feed member to be mounted on the support member of FIGS. 3 and 4, the feed member being shown flat and on a smaller scale; and FIG. 6 shows a section on the line VI—VI through the feed member of FIG. 5. As shown in FIG. 1, a sugar cane harvester 10 comprises driven wheels 12, steerable wheels 14, a top cutting unit 16 and a pair of power rotated crop lifters 18. The crop lifters are mounted one on top of each of a pair of transversely-spaced gathering walls 19 defining a crop-receiving throat. At the bottom of the throat is provided a pair of contra-rotating base cutters 20 to sever cane sticks from their roots.

Conveyor means 22 is provided to convey the harvested cane sticks to cane dividing means 24 positioned to receive cane sticks from the conveyor means and operative to cut each stick into at least two billets.

Billet receiving means comprising three flipper rollers 26 is positioned to receive billets from the cane dividing means. A hopper 28 is positioned to receive the billets as they cascade over flipper rollers 26 and a chain and slat elevator 30 carries the billets therefrom to a discharge point 32 from where they fall into a trailer 34. Trash extractors 36 and 38 are provided to remove trash from the billets as they cascade over flipper rollers 26 and the top end of elevator 30 respectively.

Conveyor means 22 comprises a large paddle roller 40, a butt lifter roller 42 and two pairs of feeding and cleaning paddle rollers 44, 46.

Figure 2:
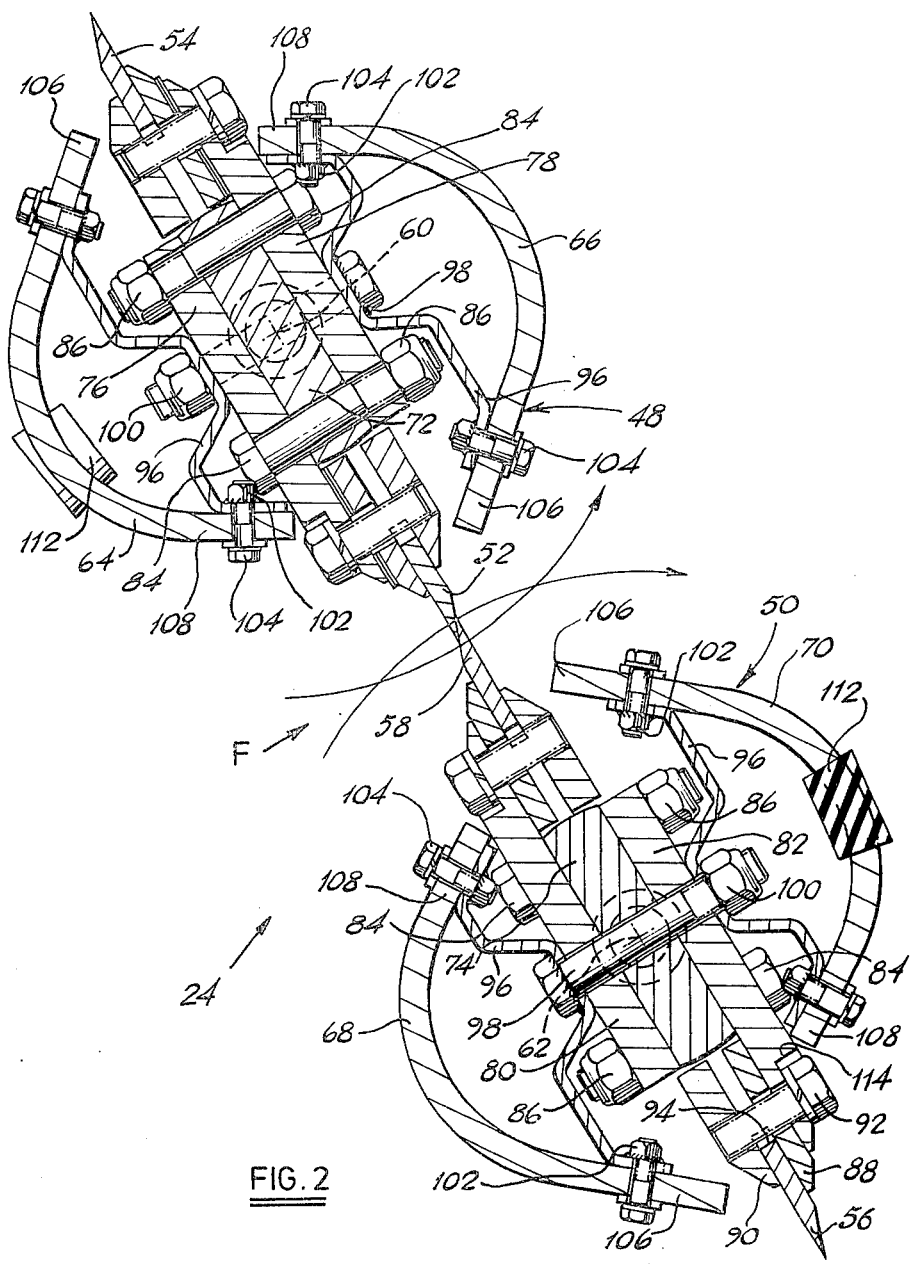
FIG. 2 shows in side elevation and on a larger scale the cane dividing means of FIG. 1.

Cane dividing means 24 is shown in greater detail in FIG. 2 and comprises a pair of contra-rotatable cane-cutting elements 48, 50. Each cane cutting element is similar in structure to the other.

As shown in FIG. 2, the cane cutting elements 48, 50 comprise pairs of outwardly projecting blades 52, 54, and 56, 58 each blade extending parallel to the axis 60 or 62 of its respective cutting element.

The blades 52, 54, 56, 58 of cutting elements 48, 50 are positioned to co-operate with each other in the manner shown in FIG. 2 to divide canes passing in the direction of arrow F between the cutting elements as the latter rotate.

Two pairs of cane feed members 64, 66 and 68, 70, to be more fully described hereafter, are mounted on the cane cutting elements, one pair on each cutting element. The feed members are positioned for engagement with the cane sticks as they are cut.

The blades and feed members of the cutting element are mounted on respective oblong-section driven shafts 72, 74. A pair of axially-extending blade mounting plates 76, 78 and 80, 82 is clamped by bolts 84 and associated nuts 86 on each of the shafts 72, 74. The blades are mounted on plates 76, 78, 80 and 82 in accordance with the teaching of our aforementioned Australian patent application No. 56702/73.

Each blade 52, 54, 56, or 58 is clamped between a blade support member 88 and an elongated blade clamping member 90 by bolts 92 engaging threads in member 90 and extending through aligned openings in support member 88 and its respective plate 76, 78, 80 or 82. Bolts 92 constitute abutments engageable with recesses 94 in the blades to limit radially inward movement of the blades and define the working position thereof.

The structure and arrangment of cane feed members 64, 66, 68 and 70 will now be described.

The four feed members are identical in structure and are formed of resilient material in the form of an oblong rectangular piece of rubber conveyor belting. The belting from which the piece is cut is 600 millimeters in width and ½ inch in thickness and has embedded therein 4 plies or layers of textile reinforcement. The upper and lower faces of the said conveyor belting are each provided by a 3 millimeter thick layer of rubber known in the art as "grade N."

Each feed member 64, 66, 68 and 70 is mounted on a support member 96 therefor and fastening means, in the form of two bolts 98 having their heads welded to their respective support members and associated nuts 100, are provided whereby the two pairs of cane feed members may be fastened to their respective cutting element 48 or 50. The bolts 98 pass through aligned openings in their respective shafts 72 and 74 and plates 76, 78, 80 and 82.

Support members 96 each have a series of 10 apertures and associated nuts 102 welded to the support member along each longitudinal edge to receive a series of bolts 104 which pass through apertures 105 in the feed members 64, 66, 68 and 70 to clamp them to the support members.

The width of each feed member measured between the longitudinal edges thereof is such that, when mounted on its support member it has a substantially uniform convex shape as seen in cross-sections taken in the radial direction with respect to the cutting elements. The longitudinal edge portions of each feed member define two ramps 106, 108 sloping towards the respective blades 52, 54, 56 and 58. The ramps 108 are positioned to allow easy access to blade clamping bolts 92.

Two of the feed members, namely members 64 and 70, are each formed with a pair of apertures 110 (FIG. 5) through which nuts 100 (constituting fasteners) and a spanner therefor can be inserted. This facilitates rapid mounting of pre-assembled feed members and their associated support members during servicing. Tapered rubber plugs 112 are bonded or glued into the apertures 110 after assembly.

In use, as harvested sugar cane sticks are fed by rollers 44, 46 towards the cane cutting elements 48, 50, the sticks are guided towards the co-operating blades 52, 58 and 54, 56 by the ramps 108 of the cane feed members. The cane feed members engage and grip the layers of cane and thereby assist its passage between the cutting elements during the time between successive chopping actions by the blades. Furthermore the ramps 106 of the cane feed members guide the cascade of billets produced by the cane cutting elements 48, 50 in the desired direction over flipper rollers 26, thereby avoiding circulation of billets with the blades 52, 54, 56 and 58 and billet loss which would be a result thereof.

The cane feed members also serve to protect the cane sticks from damage by the nuts and bolts 86, 84 and 100, 98. The heads of the blade-clamping bolts 92 are each located within a recess 114 so as to minimize cane damage thereby.

Among the advantages provided by the above embodiment of the invention are the following:

1. the rate of feeding of cane between the cane cutting elements is more precisely controlled by the feed members 64, 66, 68, and 70 than hitherto;
2. in consequence, the cane cutting elements produce cane billets of more uniform length;
3. the cane feed members are resistant to the impact of foreign bodies such as rocks and fencing posts. The feed members are able to resiliently deform to accommodate the passage of such articles and then immediately return to their previous shape. Rigid steel feed members are permanently bent by such articles and after bending no longer feed the cane efficiently. Sticks which lodge in the bent or recessed portions of the rigid feed members are fed more slowly than other sticks and consequently are chopped by the blades 52, 54, 56 and 58 into shorter billets.

The reasons for the surprisingly improved feeding action provided by the feed members in the embodiment described above, and referred to in item 1. of the advantages above, are not easy to identify but are believed at least in part to arise from the ability of the feed members to conform to the changing uneven shape of the mat of cane sticks passing between the cane cutting elements.

Among modifications which could be made in the above described embodiment without departing from the scope of the invention are the following:

1. the use of feed elements on the bottom cane cutting element 50 only;
2. the feed elements may be formed of natural or synthetic rubber, or of resilient plastics material or of springy steel sheet, or of any suitable combination of these materials;
3. the feed members may be reinforced with any suitable material to impart the necessary degree of stiffness thereto;
4. the feed members may be bonded or glued to their support members 96 instead of being bolted thereto; and
5. the cane cutting elements may be used in sugar cane mills or sugar cane planters as well as in sugar cane harvesters.

What we claim is:

1. A sugar cane divider comprising a frame, conveyor means operative to convey cane sticks mounted on the frame, cane dividing means mounted on the frame to receive cane sticks from the conveyor means and operative to cut each stick into at least two billets and billet receiving means mounted on the frame to receive billets from the cane dividing means; the cane dividing means comprising a pair of contra-rotatable cane cutting elements, each of which includes a driven shaft rotatably supported on the frame for rotation about an axis which is substantially perpendicular to the direction of movement of cane sticks into the cane dividing means, at least one blade attached to the driven shaft with a cutting edge radially spaced from and parallel to the axis of the driven shaft, and at least one resilient feed member with a leading edge and a trailing edge both attached to the driven shaft with at least the portion of the resilient feed member between the leading and trailing edge radially spaced from the driven shaft, and drive means to drive each cutting element so that the blades cooperate with each other to divide canes passing between the cutting elements as the cutting elements rotate.

2. The sugar cane divider of claim 1 wherein a plurality of blades and an equal number of resilient feed members are attached to the driven shaft of each contra-rotatable cane cutting element.

3. The sugar cane divider of claim 1 wherein each resilient feed member extends substantially the length of the blades.

4. The sugar cane divider of claim 1 wherein each resilient feed member is attached to a resilient feed member support frame and the support frame is attached to the driven shaft of one of the cane cutting elements.

5. The sugar cane divider of claim 1 wherein the portion of each resilient feed member between its leading and trailing edges has a substantially uniform convex shape with the leading and trailing edges closer to the axis of rotation of the driven shaft to which it is attached than the portion between the leading and trailing edges.

6. The sugar cane divider of claim 1 wherein at least one of the resilient feed members has an access aperture.

7. The sugar cane divider of claim 4 wherein each resilient feed member has at least one access aperture which provides access to the resilient feed member support frame for removing the support frame from the driven shaft to which it is attached.

* * * * *